(12) United States Patent
Black et al.

(10) Patent No.: US 7,605,330 B1
(45) Date of Patent: Oct. 20, 2009

(54) RETRACTABLE POWER AND COMMUNICATION OUTLET APPARATUS

(75) Inventors: Dave Black, Orange, CT (US); Kimberly Golden, Wallingford, CT (US); Glenn Golden, Wallingford, CT (US); Russell Hayden, Stratford, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 12/126,171

(22) Filed: May 23, 2008

Related U.S. Application Data

(60) Provisional application No. 60/933,017, filed on Jun. 4, 2007.

(51) Int. Cl.
*H01B 17/00* (2006.01)
(52) U.S. Cl. .............................. 174/54; 174/53; 174/57; 174/58; 439/131; 439/214
(58) Field of Classification Search .................... 174/53, 174/54, 58, 57, 59; 439/131, 214, 378, 215; 362/127
See application file for complete search history.

(56) References Cited

U.S. PATENT DOCUMENTS

| | | | | |
|---|---|---|---|---|
| 2,811,575 A | * | 10/1957 | Guerrero ..................... | 174/57 |
| 4,372,629 A | * | 2/1983 | Propst et al. .............. | 312/223.6 |
| 4,551,577 A | * | 11/1985 | Byrne ........................ | 174/57 |
| 5,122,069 A | * | 6/1992 | Brownlie et al. ............ | 439/131 |
| 5,575,668 A | * | 11/1996 | Timmerman ................ | 439/131 |
| 6,234,812 B1 | * | 5/2001 | Ivers et al. .................. | 439/131 |
| 6,942,502 B2 | * | 9/2005 | Sharples ..................... | 439/131 |

* cited by examiner

*Primary Examiner*—Dhiru R Patel
(74) *Attorney, Agent, or Firm*—Raymond A. Nuzzo

(57) ABSTRACT

A retractable power and communication outlet apparatus for use with an article having a work surface. The apparatus has a power and communication outlet structure that is sized to fit into an opening in the work surface of the article. The outlet structure includes a shell having a perimeter, a top end and a bottom end. At least one power outlet and/or communication outlet is connected to the shell. A bottom plate member is attached to the bottom end of the shell and has portions thereof that extend beyond the perimeter of the shell. The bottom plate member has a top side and a bottom side. The apparatus also has a slide apparatus that has a stationary rail member and a movable member that slides upon the rail member. The movable member is attached to the bottom plate member so that the power and communication outlet structure can move between a retracted position and an extended position. The apparatus includes a mounting plate for attachment to the bottom of the work surface. At least one magnet is attached to the portion of the bottom plate that extends beyond the perimeter of the shell.

8 Claims, 4 Drawing Sheets

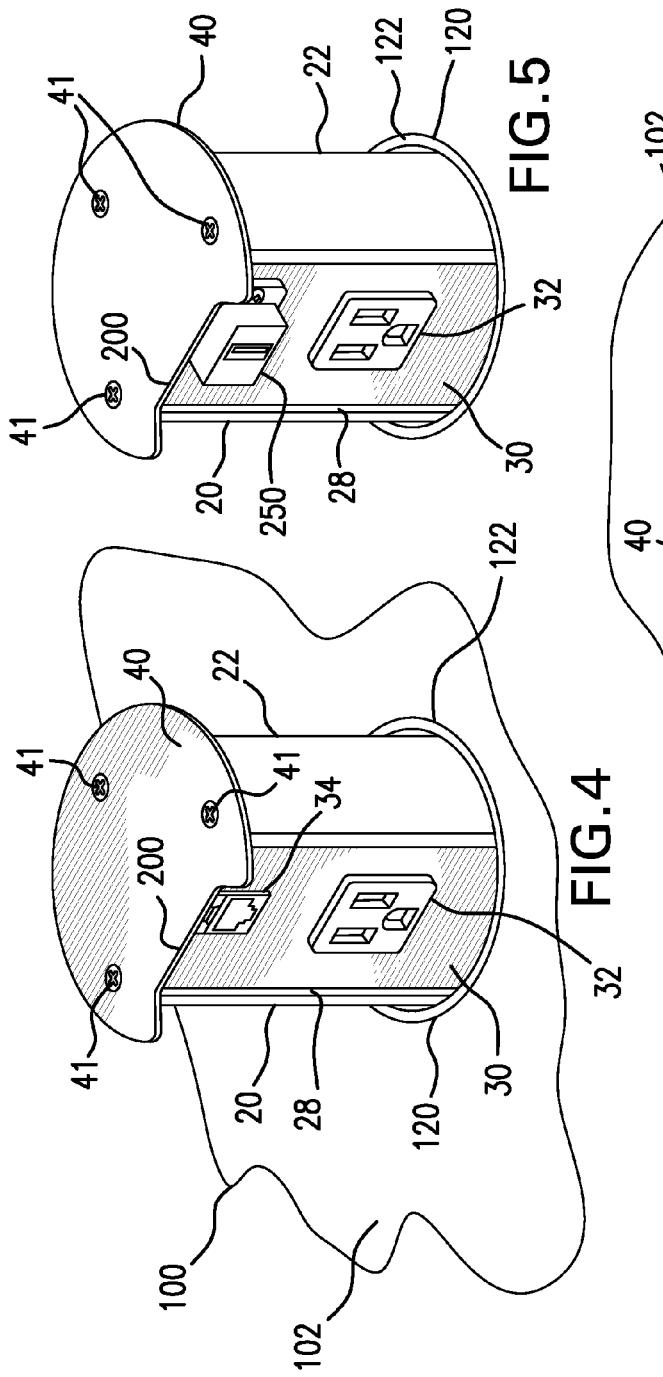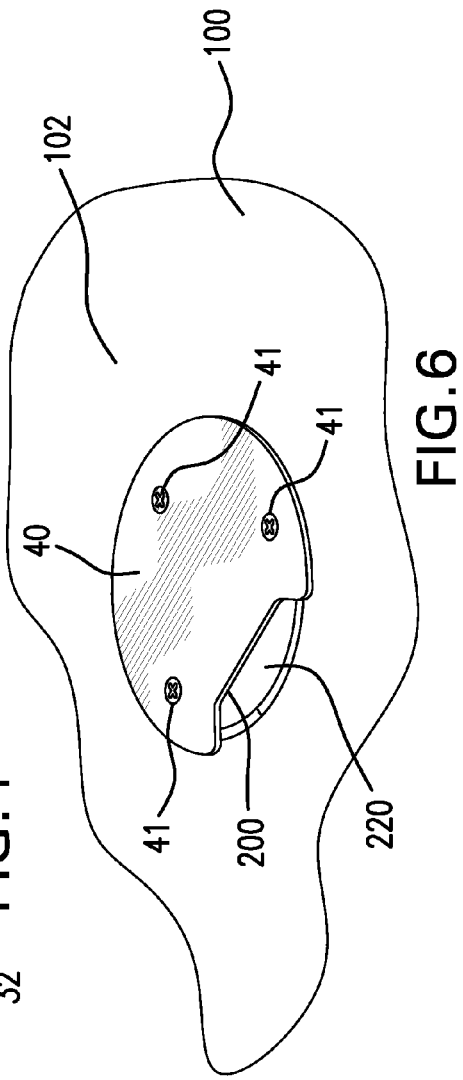

RETRACTABLE POWER AND COMMUNICATION OUTLET APPARATUS

CROSS-REFERENCE TO RELATED APPLICATIONS

This application claims the benefit of U.S. Provisional Application No. 60/933,017, filed Jun. 4, 2007. The entire disclosure of the aforesaid application No. 60/933,017 is hereby incorporated by reference.

TECHNICAL FIELD

The present invention generally relates to a retractable power and communication outlet apparatus that can be used with a furniture item that has a work surface such as a table, desk, work bench or similar article.

BACKGROUND ART

Retractable power outlets are known in the art and are described in U.S. Pat. Nos. 4,551,577 and 6,234,812. Specifically, U.S. Pat. No. 4,551,577 describes a retractable power source center that is adapted to be mounted in a furniture component. U.S. Pat. No. 6,234,812 describes a retractable power and communication outlet for mounting on a work surface such as a table or desk.

DISCLOSURE OF THE INVENTION

The present invention is directed to a retractable power and communication outlet apparatus for use with a table, desk or similar article. In one embodiment, the retractable power and communication outlet apparatus comprises an outlet structure that comprises a shell having top end and a bottom end. An outlet panel is attached to the shell. The outlet panel has at least one power outlet and/or one communication outlet. The outlet faces outward so that a user can plug a power cord or communication cable into the outlet. The retractable power and communication outlet apparatus further comprises a cover plate member attached to the top end of the shell and a bottom plate member attached to the bottom end of the shell. Portions of the bottom plate member extend beyond the perimeter of the shell. The bottom plate member has a top side and a bottom side. The retractable power and communication outlet apparatus further comprises a vertically oriented slide apparatus comprising a stationary rail member and a movable member that slides upon the rail member. The movable member can slide upward or downward with respect to the rail member. The movable member has a top end portion that is connected to the bottom plate member such that the outlet structure moves upward or downward with the movable member. The outlet structure moves between a retracted position and an extended position. When the outlet structure is in the extended position, the at least one power and/or communication outlet is positioned above the work surface of the desk, table, workbench, etc. When the outlet structure is in the retracted position, the at least one power and/or communication outlet is positioned below the work surface. The retractable power and communication outlet apparatus further comprises a mounting plate that is generally perpendicular to the axis of the slide apparatus and has a cut-out area that is sized to allow the outlet structure to move there-through. The mounting plate has a top side that is configured to be attached to the bottom side of a work surface of a desk, table, workbench, etc. The retractable power and communication outlet apparatus further comprises at least one magnet attached to the top side of the portion of the bottom plate member that extends beyond the perimeter of the shell. When the outlet structure is in the extended position, the at least one magnet becomes magnetically attached to the bottom side of the mounting plate so as to maintain the outlet structure in the extended position. In order to position the outlet structure in the retracted position, the user pushes down on the cover plate member so as to break the magnetic bond between the at least one magnet and the bottom side of the mounting plate and enable the moveable member, with the outlet structure attached thereto, to slide downward on the rail member.

Further features and advantages of the present invention are described in the ensuing description.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 4 is a perspective view of the outlet structure, originally shown in FIG. 1, in an extended state, the outlet structure having a power outlet and a telephone RJ45 outlet;

FIG. 5 is a perspective view of the outlet structure in an extended state, the outlet structure having USB outlet instead of a telephone RJ45 outlet; and FIG. 6 is a perspective view showing the outlet structure in a retracted state.

BEST MODE FOR CARRYING OUT THE INVENTION

The ensuing detailed description is exemplary of the preferred embodiment of the present invention, the scope of which is limited only by the claims appended hereto.

Figure 1:
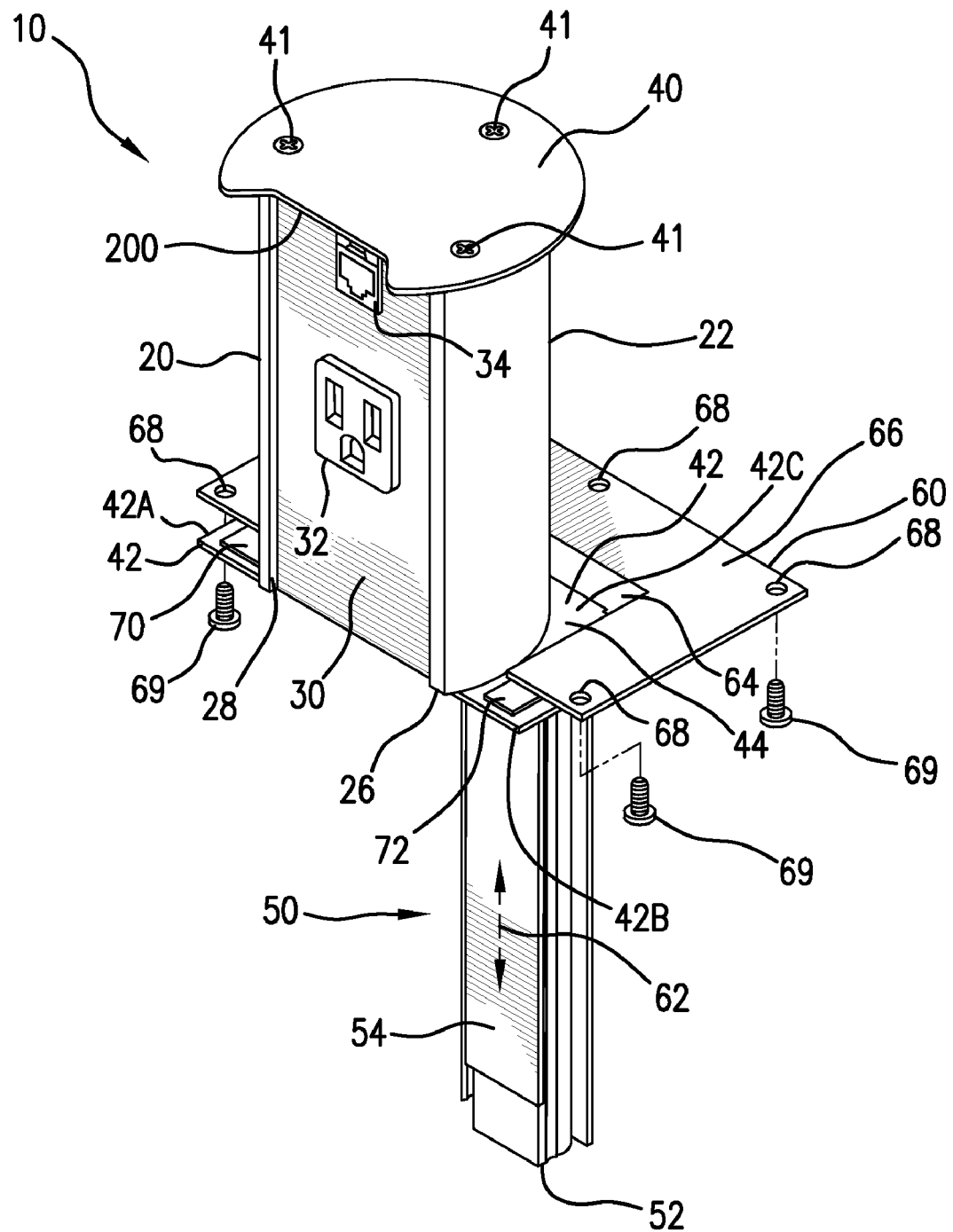
FIG. 1 is a perspective view of the retractable power and communication outlet apparatus of the present invention.
Figure 2:
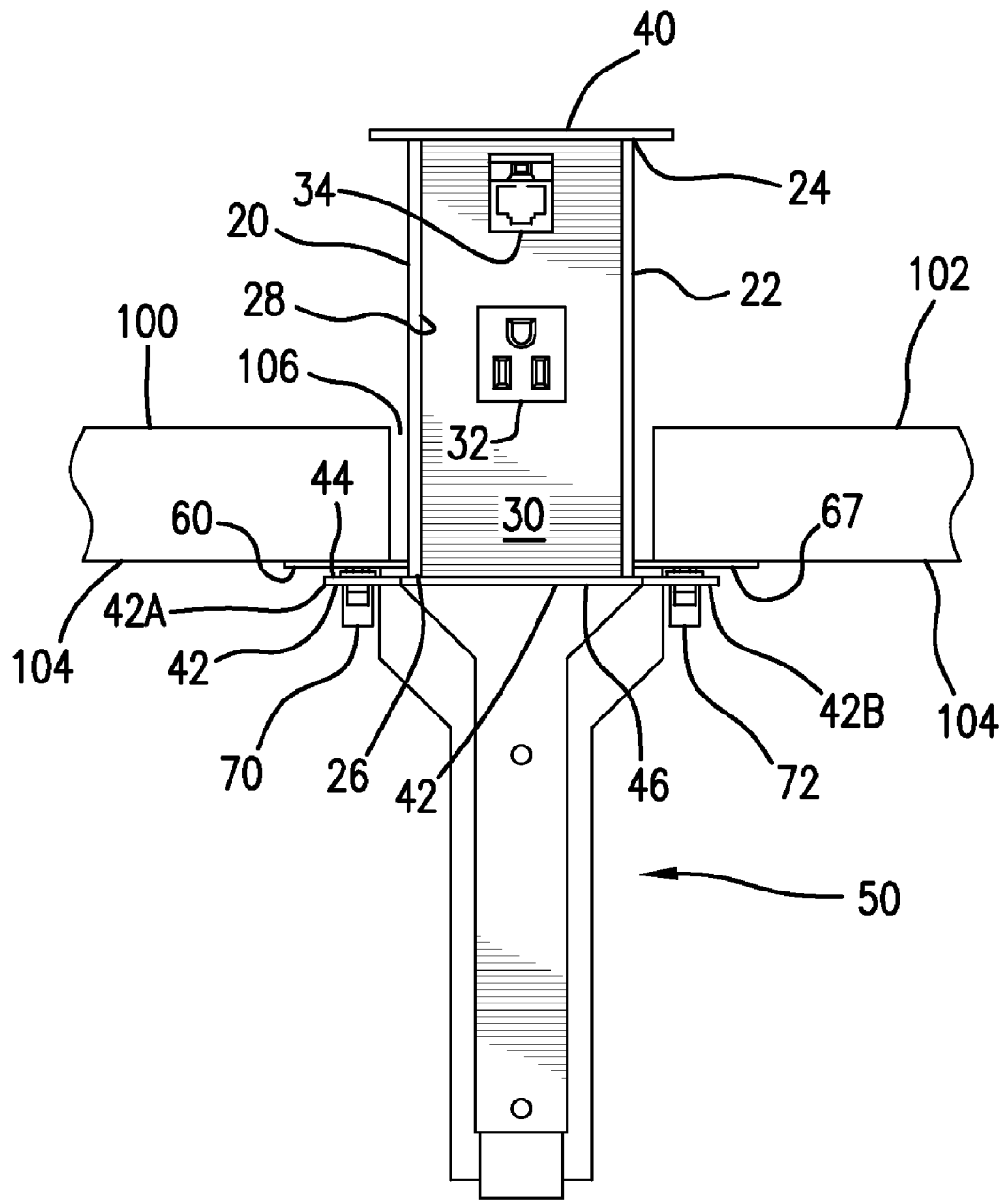
FIG. 2 is a front view of the retractable power and communication outlet apparatus of FIG. 1.

Referring to FIGS. 1 and 2, there is shown retractable power and communication outlet apparatus 10 in accordance with one embodiment of the present invention. Retractable power and communication outlet apparatus 10 is configured for use with a work surface such as that provided by a table, desk, workbench, workstation or similar article. Retractable power and communication outlet apparatus 10 comprises outlet structure 20. Outlet structure 20 comprises shell 22 which has a top end 24, bottom end 26 and open region 28. Apparatus 10 further comprises outlet panel 30 that is attached to shell 22 and positioned within open region 28. At least one power outlet 32 and/or at least one communication outlet 34 is connected to outlet panel 30 such that the power and communication outlets 32 and 34, respectively, face outward. Outlet 32 is configured to provide A.C. voltage (e.g. 117 VAC) to power office or laboratory equipment, e.g. personal computers, oscilloscopes, etc. Wires (not shown) are connected to connectors (not shown) on the rear of outlet 32 so as to provide electrical power from an electrical power source (not shown). In this embodiment, communication outlet 34 comprises an RJ45 connector that provides connection to a communication network such as a telephone communication network or the internet. Wires, which are not shown, are connected to connectors (not shown) on the rear of outlet 34 and the aforesaid communication network.

Referring to FIGS. 1 and 2, retractable power and communication outlet apparatus 10 further comprises cover plate member 40 that is attached to top end 24 of shell 22 via screws 41. Retractable power and communication outlet apparatus 10 further comprises bottom plate member 42 which is attached to bottom end 26 of shell 22. Bottom plate member 42 has portions 42A, 42B and 42C that extend beyond the perimeter of shell 22. Bottom plate member 42 has top side 44 and bottom side 46. Retractable power and communication outlet apparatus 10 further comprises vertically oriented slide apparatus 50. Vertically oriented slide apparatus 50 comprises stationary rail member 52 and movable member 54 that slides upon slide member 52 whereby movable member 54 can slide upward or downward with respect to rail member 52. Movable member 54 has a top end portion that is connected to bottom side 46 of bottom plate member 42 such that outlet structure 20 moves upward or downward with movable member 54. Thus, slide apparatus 50 allows outlet structure 20 to move between a retracted position and an extended position. When outlet structure 20 is in the extended position, the power outlet 32 and communication outlet 34 are positioned above the work surface of the desk, work bench or similar article. When outlet structure 20 is in the retracted position, the power outlet 32 and communication outlet 34 are positioned below the work surface. Retractable power and communication outlet apparatus 10 further comprises mounting plate 60 that is generally perpendicular to longitudinally extending axis 62 of slide apparatus 50 and has cut-out area 64 that is sized to allow outlet structure 20 to vertically move there-through. Mounting plate 60 has top side 66 and bottom side 67. Top side 66 is configured to be attached to the bottom side of a work surface. Mounting plate 60 includes a plurality of through-holes 68 through which screws 69 are inserted in order to attach mounting plate 60 to the bottom side of a work surface. This feature will be explained in detail in the ensuing description.

Referring to FIG. 1, retractable power and communication outlet apparatus 10 further comprises magnets 70 and 72 that are attached to bottom plate member 42. Each magnet 70 and 72 has a portion thereof protruding through top side 44 of bottom plate member 42. Each magnet 70 and 72 extends for a portion of the width of bottom plate member 42. When outlet structure 20 is in the extended position, magnets 70 and 72 are magnetically attached to bottom side 67 of mounting plate 60 so as to maintain outlet structure 20 in the extended position. In order to position outlet structure 20 in the retracted position, the user pushes down on cover plate member 40 so as to break the magnetic bonds between magnets 70 and 72 and bottom side 67 of mounting plate 60 and enable moveable member 54, with outlet structure 20 attached thereto, to slide downward on rail member 52.

Figure 3:
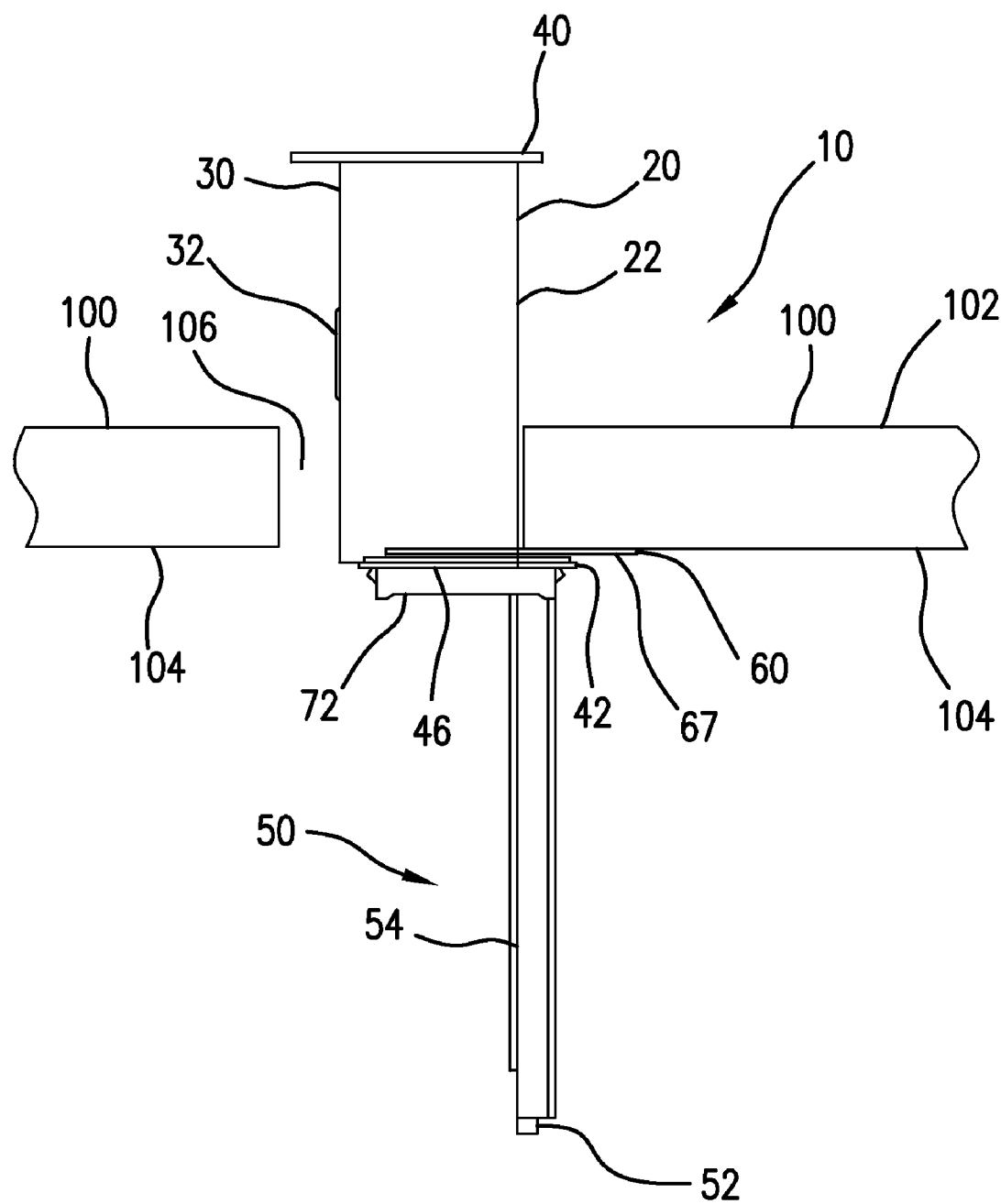
FIG. 3 is a side view of the retractable power and communication outlet apparatus of FIG. 1.

Referring to FIGS. 2, 3 and 4, there is shown retractable power and communication outlet apparatus 10 operatively connected to an article of furniture 100 having work surface 102, bottom side 104 and opening 106. Opening 106 is sized to allow outlet structure 20 to pass there-through. Mounting plate 60 is attached to bottom side 104 via screws 69 such top side 66 of mounting plate 60 contacts bottom side 104 of article of furniture 100. Slide apparatus 50 is positioned below work surface 102 and stationary rail member 52 is attached to a lower portion (not shown) of article of furniture 100. FIGS. 2, 3 and 4 show outlet structure 20 in the extended state wherein magnets 70 and 72 are magnetically attached to bottom side 67 of mounting plate 60 and power outlet 32 and communication outlet 34 are located above work surface 102 and accessible to the user. FIG. 6 shows outlet structure 20 in the retracted state. The manner in which outlet structure 20 is configured into the extended state is described in the ensuing description.

Referring to FIG. 4, in a preferred embodiment, grommet sleeve 120 is positioned in the top portion of opening 106 of article of furniture 100. Rim 122 of grommet sleeve 120 contacts work surface 102. FIG. 6 shows outlet structure 20 in the retracted state. When outlet structure 20 is in the retracted state, cover plate member 40 sits upon rim 122 of grommet sleeve 120.

Referring to FIGS. 4 and 6, cover plate member 40 has cut-out 200. When outlet structure 20 is in the retracted position, cut-out 200 forms an opening 220 that is in communication with opening 106 in article of furniture 100. When outlet structure 20 is in the extended state, an A.C. voltage cord can be plugged into power outlet 32. Outlet structure 20 can then be positioned in the retracted position and cut-out 200 allows the A.C. voltage cord to remain plugged into power outlet 32. Thus, A.C. power cords connected to electrical equipment located on work surface 102 can extend through opening 220, down through opening 106 of article of furniture 100 and be connected to power outlet 32 while outlet structure 20 is in the retracted state. In the same manner, a communication cable or wire can extend through opening 220 and remain plugged into communication outlet 34 when outlet structure 20 is in the retracted state.

FIG. 6 shows outlet structure 20 in the retracted state. In order to configure outlet structure 20 in the extended state, the user simply inserts his or her finger into opening 220, grasps cover plate member 40 and lifts outlet structure 20 upward. This causes moveable member 54 to move upward as well. The user continues to lift outlet structure 20 upward until magnets 70 and 72 contact and become magnetically attached to bottom side 67 of mounting plate 60.

FIG. 5 shows the retractable power and communication outlet apparatus 10 of the present invention with a modification. Specifically, the RJ45 outlet is replaced with USB port 250. It is to be understood that other types of power and communication outlets can be used on outlet panel 30 as well.

A variety of materials may be used to fabricate apparatus 10, e.g. plastic, metals, resins, composites, etc.

The size of retractable power and communication outlet apparatus 10 and components thereof may be configured to have any suitable size.

While the foregoing description is exemplary of the present invention, those of ordinary skill in the relevant arts will recognize the many variations, alterations, modifications, substitutions and the like are readily possible, especially in light of this description, the accompanying drawings and the claims drawn hereto. In any case, because the scope of the invention is much broader than any particular embodiment, the foregoing detailed description should not be construed as a limitation of the present invention, which is limited only by the claims appended hereto.

What is claimed is:

1. A retractable power and communication outlet apparatus for use with an article having a work surface comprising:
   a power and communication outlet structure sized to fit into an opening in the work surface of the article, the outlet structure comprising a shell having a perimeter, a top end and a bottom end, the outlet structure further comprising at least one power outlet or communication outlet attached to the shell;
   a bottom plate member attached to the bottom end of the shell and having portions thereof that extend beyond the perimeter of the shell, the bottom plate member having a top side and a bottom side;

a slide apparatus comprising a stationary rail member and a movable member that slides upon the rail member, the movable member being attached to the bottom plate member so that the power and communication outlet structure can move between a retracted position and an extended position;

a mounting plate configured for attachment to a bottom side of a work surface;

at least one magnet attached to the portion of the bottom plate that extends beyond the perimeter of the shell; and wherein in order to position the power and communication outlet structure in the extended position, a user pulls the outlet structure upward until the at least one magnet becomes magnetically attached to the mounting plate, and in order to position the power and communication outlet structure in the retracted position, the user applies a downward force on the power and communication outlet structure so as to break the magnetic bond between the at least one magnet and the mounting plate.

2. The apparatus according to claim 1 further comprising a cover plate member attached to the top end of the shell.

3. The apparatus according to claim 1 wherein a portion of the cover plate member is cut-away to allow a user to pull the power and communication outlet structure upward.

4. The apparatus according to claim 1 further comprising an outlet panel, the at least one power outlet or communication outlet being connected to the outlet panel.

5. The apparatus according to claim 1 wherein the movable member is connected to the bottom side of the bottom plate member.

6. The apparatus according to claim 1 wherein the at least one magnet comprises a plurality of magnets.

7. The apparatus according to claim 1 further comprising a grommet sleeve disposed in the opening in the article such that the grommet sleeve extends about the power and communication outlet structure, and wherein the cover plate member contacts a top portion of the grommet sleeve when the power and communication outlet structure is in the retracted state.

8. A work station having a retractable power and communication outlet apparatus, the work station having a work surface and a bottom side that is opposite the work surface, the work station having an opening therein that extends through the work surface, the retractable power and communication outlet apparatus comprising:

a grommet sleeve positioned within the opening in the work station;

a power and communication outlet structure movable within the grommet sleeve, the outlet structure comprising a shell having a perimeter, a top end and a bottom end, the outlet structure further comprising at least one power outlet or communication outlet connected to the shell;

a cover plate attached to the top end of the shell;

a bottom plate member attached to the bottom end of the shell and having portions thereof that extend beyond the perimeter of the shell;

a vertically oriented slide apparatus disposed within the work station and positioned below the opening in the work station, the slide apparatus comprising a stationary rail member and a movable member that slides upon the stationary rail member, the moveable member being attached to the bottom plate member such that the power and communication outlet structure can move upward to an extended position wherein the at least one power outlet or communication outlet is above the work surface and downward to a retracted position wherein the at least one power outlet or communication outlet is below the work surface;

a mounting plate attached to the bottom side of the work station;

at least one magnet attached to the portion of the bottom plate member that extends beyond the perimeter of the shell; and wherein in order to position the power and communication outlet structure in the extended position, a user grasps the cover plate member and lifts the outlet structure upward until the at least one magnet becomes magnetically attached to the mounting plate, and in order to position the power and communication outlet structure in the retracted position, the user applies a downward force on the cover plate member so as to break the magnetic bond between the at least one magnet and the mounting plate, and wherein the cover plate member contacts an upper portion of the grommet sleeve when the power and communication outlet structure is in the retracted state.

\* \* \* \* \*